(12) United States Patent
Su et al.

(10) Patent No.: US 12,494,502 B2
(45) Date of Patent: Dec. 9, 2025

(54) HIGH VOLTAGE BATTERY INCLUDING TAB-FREE AND WELD-FREE FOLDED BIPOLAR SOLID-STATE BATTERIES

(71) Applicant: GM GLOBAL TECHNOLOGY OPERATIONS LLC, Detroit, MI (US)

(72) Inventors: Qili Su, Shanghai (CN); Zhe Li, Anda (CN); Jingyuan Liu, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 643 days.

(21) Appl. No.: 17/886,579

(22) Filed: Aug. 12, 2022

(65) Prior Publication Data

US 2023/0261246 A1    Aug. 17, 2023

(30) Foreign Application Priority Data

Feb. 16, 2022  (CN) .......................... 202210141623.5

(51) Int. Cl.
*H01M 10/04* (2006.01)
*H01M 10/613* (2014.01)
(Continued)

(52) U.S. Cl.
CPC ... *H01M 10/0431* (2013.01); *H01M 10/0418* (2013.01); *H01M 10/613* (2015.04); *H01M 10/625* (2015.04); *H01M 10/647* (2015.04); *H01M 10/653* (2015.04); *H01M 10/6557* (2015.04); *H01M 10/6567* (2015.04);
(Continued)

(58) Field of Classification Search
CPC ......... H01M 10/0431; H01M 10/0418; H01M 10/613; H01M 10/625; H01M 10/647; H01M 10/653; H01M 10/6557; H01M 10/6567; H01M 50/207; H01M 50/249; H01M 50/507; H01M 2220/20; Y02E 60/10
See application file for complete search history.

(56) References Cited

U.S. PATENT DOCUMENTS 6,120,563 A     9/2000  Kraft et al.
10,714,756 B2   7/2020  Dai et al.
(Continued)

OTHER PUBLICATIONS

U.S. Appl. No. 17/560,673, Su et al.
(Continued)

*Primary Examiner* — Eugenia Wang

(57) ABSTRACT

A battery system comprises N folded bipolar batteries folded in an "S"-shaped configuration. First and second folded portions of each of the N folded bipolar batteries are arranged on opposite ends of the "S"-shaped configuration. First side portions and second side portions of each of the N folded bipolar batteries are arranged between the first and second folded portions. One or more of the first folded portions on a first one of the N folded bipolar batteries are in direct electrical contact with one or more of the second folded portions on a second one of the N folded bipolar batteries. One or more of the first side portions on a third one of the N folded bipolar batteries are in direct electrical contact with one or more of the second side portions on a fourth one of the N folded bipolar batteries.

10 Claims, 14 Drawing Sheets

(51) Int. Cl.
*H01M 10/625* (2014.01)
*H01M 10/647* (2014.01)
*H01M 10/653* (2014.01)
*H01M 10/6557* (2014.01)
*H01M 10/6567* (2014.01)
*H01M 50/207* (2021.01)
*H01M 50/249* (2021.01)
*H01M 50/507* (2021.01)

(52) U.S. Cl.
CPC ....... *H01M 50/207* (2021.01); *H01M 50/249* (2021.01); *H01M 50/507* (2021.01); *H01M 2220/20* (2013.01)

(56) References Cited

U.S. PATENT DOCUMENTS

| | | |
|---|---|---|
| 12,146,519 B2 | 11/2024 | Gaunt et al. |
| 2004/0161667 A1* | 8/2004 | Fukuzawa ......... H01M 10/0525 429/185 |
| 2014/0004399 A1 | 1/2014 | Kim et al. |
| 2017/0271708 A1* | 9/2017 | Yoshima ........... H01M 10/0418 |
| 2020/0036053 A1 | 1/2020 | Li et al. |
| 2020/0036070 A1 | 1/2020 | Li et al. |
| 2020/0119357 A1 | 4/2020 | Hou et al. |
| 2020/0403267 A1 | 12/2020 | Li et al. |
| 2021/0020929 A1 | 1/2021 | Kong et al. |
| 2021/0021009 A1 | 1/2021 | Li et al. |
| 2021/0028481 A1 | 1/2021 | Hou et al. |
| 2021/0036310 A1 | 2/2021 | Hou et al. |
| 2021/0036360 A1 | 2/2021 | Li et al. |
| 2021/0036373 A1 | 2/2021 | Li et al. |
| 2021/0050157 A1 | 2/2021 | Hou et al. |
| 2021/0050596 A1 | 2/2021 | Li et al. |
| 2021/0057776 A1 | 2/2021 | Lu et al. |
| 2021/0066746 A1 | 3/2021 | Hou et al. |
| 2021/0111426 A1 | 4/2021 | Li et al. |
| 2021/0135224 A1 | 5/2021 | Hou et al. |
| 2021/0408609 A1 | 12/2021 | Nanni |
| 2022/0140422 A1 | 5/2022 | Chen et al. |
| 2022/0263055 A1 | 8/2022 | Hou et al. |
| 2022/0263129 A1 | 8/2022 | Lu et al. |
| 2022/0302526 A1 | 9/2022 | Li et al. |
| 2022/0407079 A1 | 12/2022 | Lu et al. |
| 2023/0015143 A1 | 1/2023 | Su et al. |
| 2023/0024667 A1 | 1/2023 | Li et al. |
| 2023/0025830 A1 | 1/2023 | Su et al. |
| 2023/0046608 A1 | 2/2023 | Su et al. |

OTHER PUBLICATIONS

U.S. Appl. No. 17/038,761, Frieberg et al.
U.S. Appl. No. 17/171,489, Frieberg et al.
U.S. Appl. No. 17/481,179, Li et al.
U.S. Appl. No. 17/522,331, Li et al.
U.S. Appl. No. 17/542,299, Li et al.
U.S. Appl. No. 17/543,160, Lu et al.

* cited by examiner

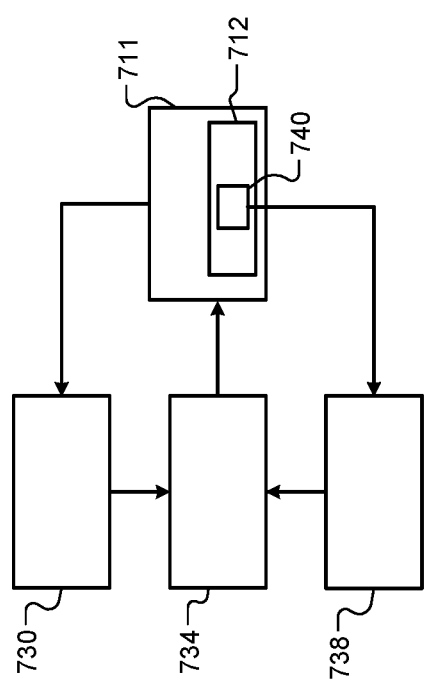

HIGH VOLTAGE BATTERY INCLUDING TAB-FREE AND WELD-FREE FOLDED BIPOLAR SOLID-STATE BATTERIES

CROSS-REFERENCE TO RELATED APPLICATIONS

This application claims the benefit of Chinese Patent Application No. 202210141623.5, filed on Feb. 16, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to batteries and more particularly to a high voltage battery including folded bipolar batteries.

With the proliferation of electric vehicles, the demand for batteries such as bipolar batteries having compact size and high energy density is increasing. Bipolar batteries include a plurality of bipolar electrodes that are packaged in a battery container by stacking or winding the bipolar electrodes.

In stacking-type bipolar batteries, the bipolar electrodes are stacked one above the other in a battery container. Stacking-type bipolar batteries suffer from a high risk of contamination due to electrode punching used during stacking. The stacking-type bipolar batteries also suffer from internal short-circuit problems when a blocker used to isolate adjacent bipolar electrodes fails.

In wound-typed bipolar batteries, a stack of bipolar electrodes is wound like a bale of hay or a roll of carpet in a battery container. Wound-typed bipolar batteries suffer from non-uniform pressure on electrodes and inefficient container space utilization. As can be appreciated, it is very challenging to package bipolar electrodes in a battery container.

SUMMARY

A battery system comprises N folded bipolar batteries, where N is an integer greater than one. Each of the N folded bipolar batteries includes a positive current collector, a negative current collector, and a plurality of anodes, cathodes and current collectors arranged between the positive current collector and the negative current collector. Each of the N folded bipolar batteries are folded in an "S"-shaped configuration. A plurality of first folded portions of each of the N folded bipolar batteries are arranged on one end of the "S"-shaped configuration. A plurality of second folded portions of each of the N folded bipolar batteries are arranged on an opposite end of the "S"-shaped configuration. First side portions and second side portions of each of the N folded bipolar batteries are arranged between the plurality of first folded portions and the plurality of second folded portions. At least one of one or more of the plurality of first folded portions on a first one of the N folded bipolar batteries are in direct electrical contact with one or more of the plurality of second folded portions on a second one of the N folded bipolar batteries; and one or more of the first side portions on a third one of the N folded bipolar batteries is in direct electrical contact with one or more of the second side portions on a fourth one of the N folded bipolar batteries.

In other features, the plurality of first folded portions on first alternating ones of the N folded bipolar batteries are in direct electrical contact with the plurality of second folded portions on second alternating ones of the N folded bipolar batteries. The first side portions on first alternating ones of the N folded bipolar batteries are in direct electrical contact with the second side portions on second alternating ones of the N folded bipolar batteries.

In other features, the N folded bipolar batteries include M groups each including N/M of the N folded bipolar batteries, where M is an integer greater than zero. The M groups are connected in series.

In other features, the M groups are arranged side by side. Electrical orientations of adjacent ones of the M groups alternate. The adjacent ones of the M groups are connected together using one or more busbars. The N folded bipolar batteries include M groups each including N/M of the N folded bipolar batteries, where M is an integer greater than zero. The M groups are connected in parallel.

In other features, the M groups are arranged side by side. Electrical orientations of adjacent pairs of the M groups do not alternate. The adjacent pairs of the M groups are connected together using a plurality of busbars.

In other features, the N folded bipolar batteries include M groups each including N/M of the N folded bipolar batteries, where M is an integer greater than zero. The M groups are connected in at least one of series and parallel.

In other features, thermal gel is arranged on facing surfaces of the at least two of the M groups. A coolant manifold includes cooling channels and is arranged between the at least two of the M groups and in contact with thermal gel on the facing surfaces of at least two of the M groups. The plurality of first folded portions on at least one of the N folded bipolar batteries are in direct electrical contact with the plurality of second folded portions on a second one of the N folded bipolar batteries. The first side portion on a third one of the N folded bipolar batteries is in direct electrical contact with the second side portion on a fourth one of the N folded bipolar batteries.

A battery system comprises N folded bipolar batteries, where N is an integer greater than one. Each of the N folded bipolar batteries are folded in an "S"-shaped configuration. A plurality of first folded portions of each of the N folded bipolar batteries are arranged on one end of the "S"-shaped configuration. A plurality of second folded portions of each of the N folded bipolar batteries are arranged on an opposite end of the "S"-shaped configuration. First side portions and second side portions of each of the N folded bipolar batteries are arranged between the plurality of first folded portions and the plurality of second folded portions. At least two of the plurality of first folded portions of a first one of the N folded bipolar batteries are in direct electrical contact with at least two of the plurality of second folded portions of a second one of the N folded bipolar batteries.

In other features, the plurality of first folded portions on first alternating ones of the N folded bipolar batteries are in direct electrical contact with the plurality of second folded portions on second alternating ones of the N folded bipolar batteries. At least one of the first side portions on a third one of the N folded bipolar batteries is in direct electrical contact with at least one of the second side portions a fourth one of the N folded bipolar batteries. The N folded bipolar batteries include M groups each including N/M of the N folded bipolar batteries, where M is an integer greater than zero.

In other features, the adjacent pairs of the M groups are connected together using one or more busbars.

A battery system comprises N folded bipolar batteries, where N is an integer greater than one. A plurality of first folded portions of each of the N folded bipolar batteries are arranged on one end of the "S"-shaped configuration. A plurality of second folded portions of each of the N folded bipolar batteries are arranged on an opposite end of the "S"-shaped configuration. First and second side portions are arranged between the plurality of first folded portions and the plurality of second folded portions. The plurality of first folded portions of a first one of the N folded bipolar batteries are in direct electrical contact with the plurality of second folded portions of a second one of the N folded bipolar batteries. The first side portion on a third one of the N folded bipolar batteries is in direct electrical contact with the second side portion on a fourth one of the N folded bipolar batteries.

In other features, the N folded bipolar batteries include M groups each including N/M of the N folded bipolar batteries, where M is an integer greater than zero. First ones of the M groups are connected in series. Second ones of the M groups are connected in parallel.

In other features, thermal gel is arranged on facing surfaces of the at least two of the M groups. A coolant manifold includes cooling channels and is arranged between the at least two of the M groups and in contact with thermal gel on the facing surfaces of at least two of the M groups.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 12 is a functional block diagram of an example of a coolant system according to the present disclosure.

In the drawings, reference numbers may be reused to identify similar and/or identical elements.

DETAILED DESCRIPTION

While the foregoing description refers to battery systems including folded bipolar batteries for electric vehicles, the battery systems can be used in other non-vehicular applications.

Bipolar batteries improve energy density of a battery pack by reducing connecting tabs, battery packaging, and cooling systems. However, packaging a stack of bipolar electrodes inside a conventional battery container by stacking or winding is challenging. Stacking-type bipolar batteries suffer from the risk of contamination from electrode punching and the risk of internal short-circuits due to blocker failure. Wound-type bipolar batteries suffer from non-uniform pressure on electrodes and inefficient utilization of space in the battery container.

The present disclosure relates to bipolar batteries including stacked bipolar electrodes folded into a repeating S-shape to increase utilization of space in the battery container and provide significant scalability. The present disclosure also relates to various arrangements of the folded bipolar batteries for higher voltage applications. The battery systems described herein increase the power density of bipolar battery systems and reduce cost by eliminating welded tabs and/or busbars.

Figure 1:
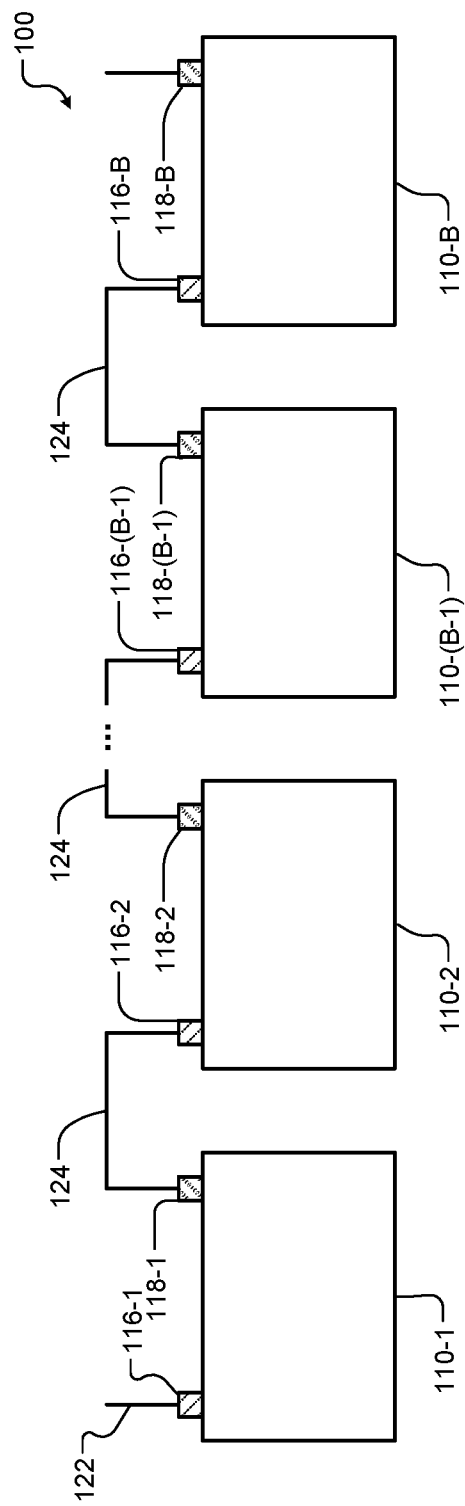
FIG. 1 is a functional block diagram illustrating an example of a battery system including battery cells connected by busbars and welded tabs.

Referring now to FIG. 1, a battery 100 is made by connecting B battery cells 110-1, 110-2, . . . 110-B (where B is an integer greater than one) (collectively battery cells 110) in series. The battery cells 110 include welded tabs 116-1, 116-2, . . . , and 116-B (e.g. positive terminals) and 118-1, 118-2, . . . , and 118-B (e.g. negative terminals) that are connected by busbars 124 in series (shown), parallel (not shown) or combinations thereof. The total voltage of the battery 100 is equal to B times the voltage of each of the battery cells 110. However, this arrangement is not high density and requires busbars and welded tabs.

Figure 2:
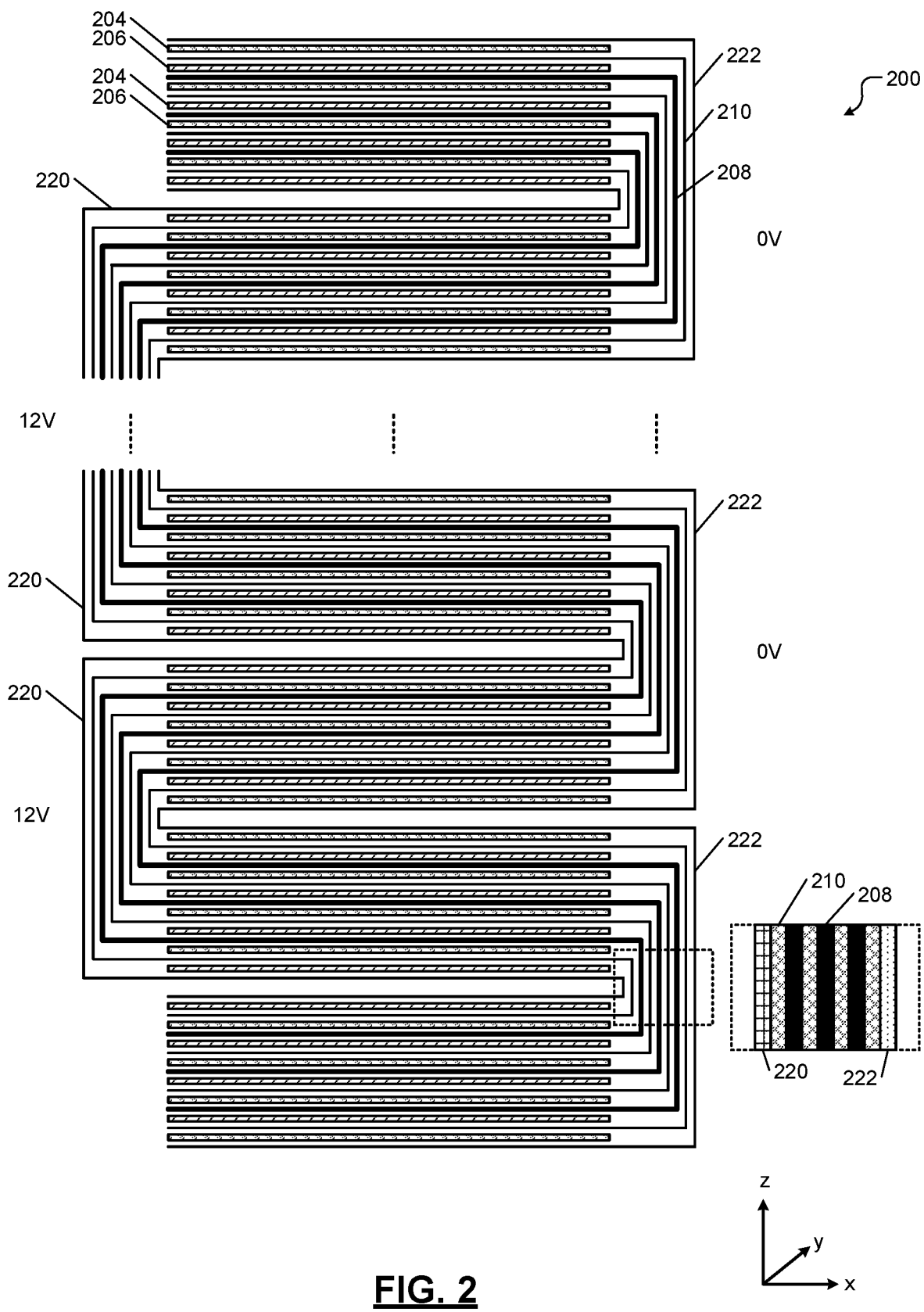
FIG. 2 is a cross-sectional view of an example of a folded bipolar battery according to the present disclosure.
Figure 3:
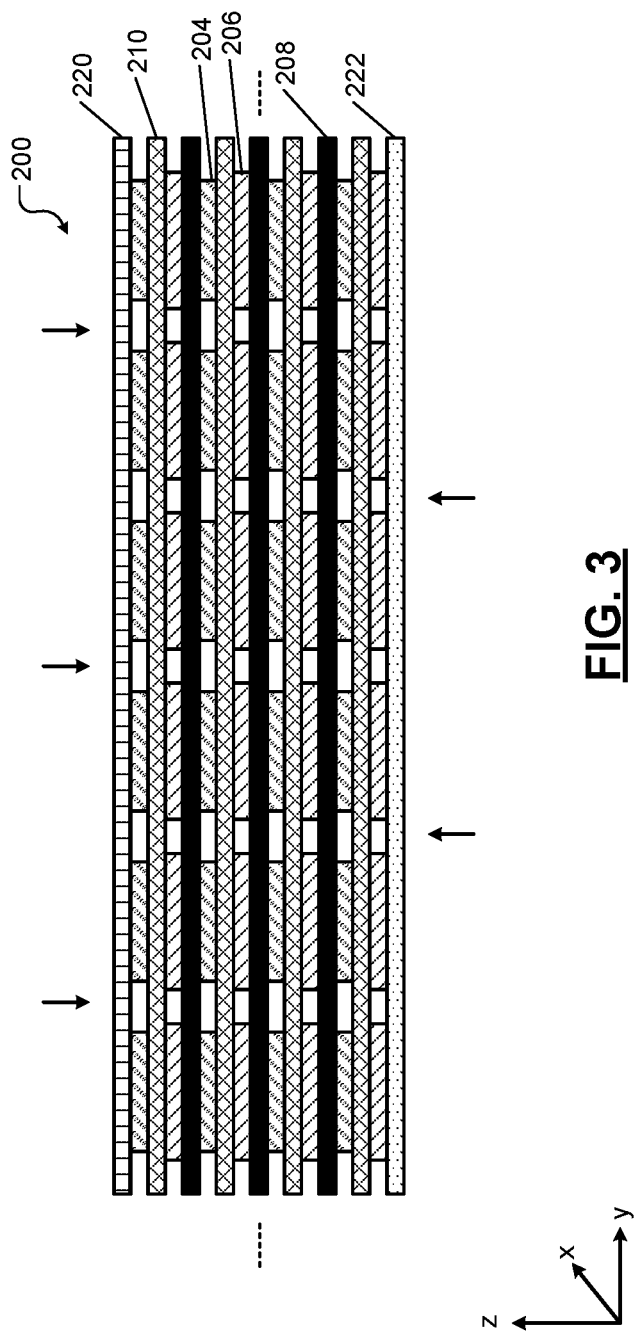
FIG. 3 is another cross-sectional view of an example of a portion of a folded bipolar battery according to the present disclosure.
Figure 4:
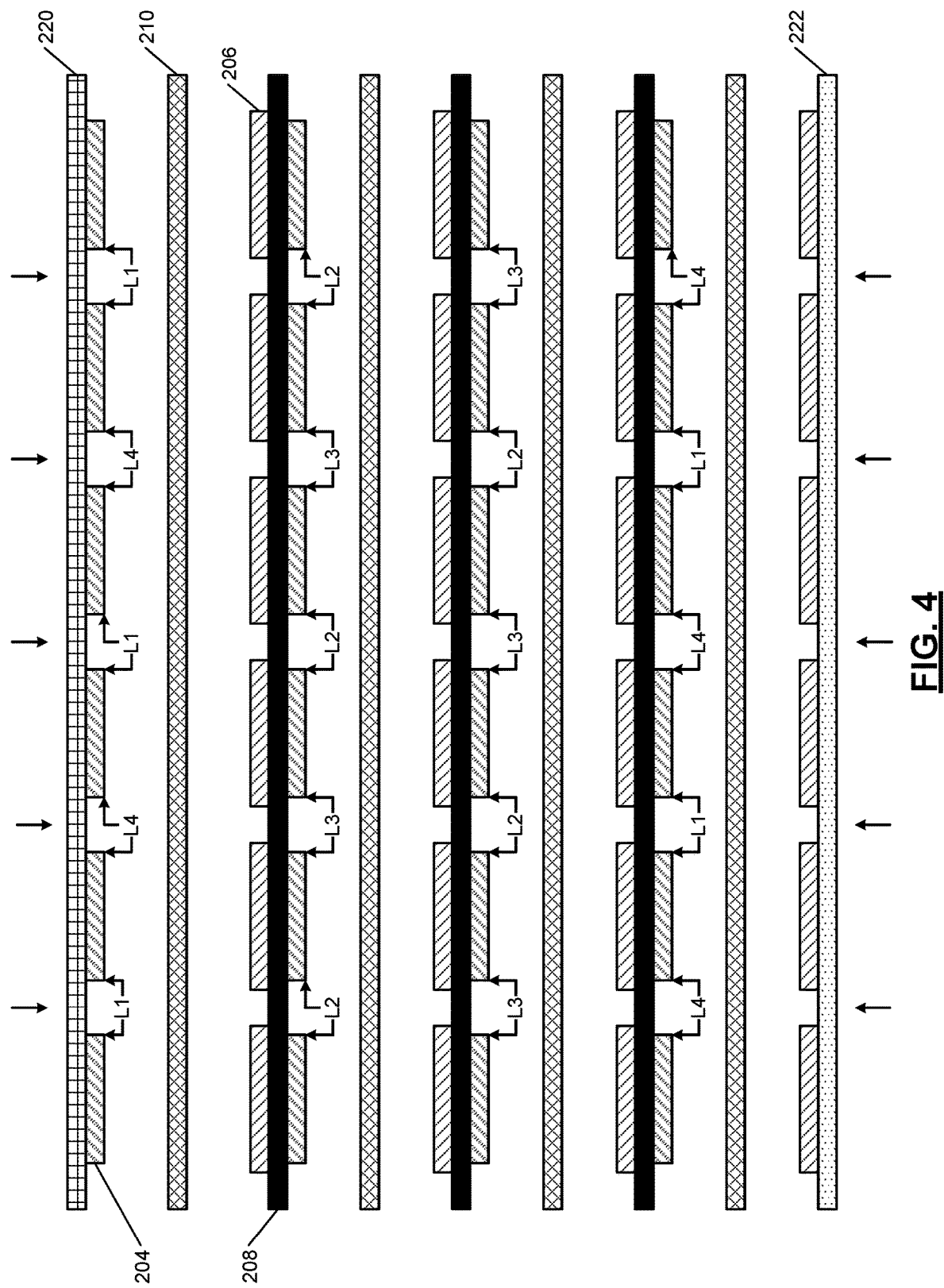
FIG. 4 is an exploded cross-sectional view of an example of a portion of a folded bipolar battery according to the present disclosure.

Referring now to FIGS. 2-4, an example of a folded bipolar battery is shown. While the following description describes an example of a folded bipolar battery, additional details can be found in co-owned Chinese Patent Application No. 202111044253.5, filed on Sep. 7, 2021, which is hereby incorporated by reference in its entirety.

In FIGS. 2 and 3, an S-shaped stack 200 of bipolar electrodes is shown. In this example, N vertically stacked bipolar electrodes are folded in an S-shape along the Z-axis, where N is an integer greater than 1. A length of vertically stacked bipolar electrodes is initially sliced along the Z-axis at a predetermined distance that is greater than the length of the battery container measured along the X-axis. For example, the length of the N vertically stacked bipolar electrodes is greater than N times the length of a typical stack battery, where N is an integer greater than 1. The sliced portion of length of the vertically stacked bipolar electrodes is then folded in the form of an S-shape and packed (by applying pressure on the folded stack along the Z-axis) to fit the folded stack in a battery container (not shown).

The bipolar batteries designed using the S-shaped stacks of the bipolar electrodes do not suffer from contamination, which occurs due to electrode punching used in the stacking-type bipolar batteries. The bipolar batteries designed using the S-shaped stacks of the bipolar electrodes also utilize the space in the battery container more efficiently than the wound-type bipolar batteries. The bipolar batteries designed using the S-shaped stacks of the bipolar electrodes have significantly smaller dead spaces in the battery container than the wound-type bipolar batteries. Further, the S-shaped stacking provides scalability since the stack of the bipolar electrodes can be folded in the S-shape along the Z-axis to any height to match the height of the battery container. Various stacking and folding schemes described below further enhance scalability.

The S-shaped stack 200 of bipolar electrodes comprises a plurality of bipolar electrodes stacked vertically on top of one another along the Z-axis. Each bipolar electrode comprises a plurality of cathodes 204 and a plurality of anodes 206 separated by a bipolar current collector 208. The cathodes 204 and the anodes 206 are arranged on opposite sides of the bipolar current collector 208 along the length of the bipolar current collector 208. The bipolar current collector 208 extends throughout the length of the S-shaped stack 200. The anodes 206 are slightly longer than the cathodes 204.

The cathodes 204 are separated (i.e., spaced) from each other by first predetermined distances. The anodes 206 are separated (i.e., spaced) from each other by second predetermined distances. The first and second predetermined distances are selected to allow folding of the length of vertically stacked bipolar electrodes between the cathodes 204 and the anodes 206 as shown.

A layer of a flexible ion conducting film 210 (hereinafter called the gel 210 for convenience) is disposed between each bipolar electrode. Specifically, the gel 210 is disposed between the cathodes 204 of a first bipolar electrode and the anodes 206 of an adjacent bipolar electrode. The gel 210 extends throughout the length of the S-shaped stack 200 along the X-axis. The bipolar current collector 208 and the gel 210 extend through each turn of the S-shaped stack 200. Due to the selection of the first and second predetermined distances, the cathodes 204 and the anodes 206 are not present in the turns (i.e., the folds) of the S-shaped stack 200.

A positive current collector 220 and a negative current collector 222 are arranged along first and second sides of the S-shaped stack 200 along the length of the S-shaped stack 200. Accordingly, the positive and negative current collectors 220, 222 extend throughout the length of the S-shaped stack 200 along the X-axis, including through the turns (i.e., the folds) of the length of the S-shaped stack 200. The stack of the bipolar electrodes and the layers of the gel 210 are sandwiched between the positive and negative current collectors 220, 222 along the length of the S-shaped stack 200.

The positive current collector 220 is arranged above the top bipolar electrode in the S-shaped stack 200. Specifically, a layer of the gel 210 is arranged on the anodes 206 of the top bipolar electrode in the S-shaped stack 200, and the positive current collector 220 is arranged on the layer of the gel 210 that is arranged on the anodes 206 of the top bipolar electrode. A layer of the cathodes 204 is arranged on an inner surface of the positive current collector 220 so that the layer of the cathodes 204 on the inner surface of the positive current collector 220 is sandwiched between the inner surface of the positive current collector 220 and the layer of the gel 210 that is arranged on the anodes 206 of the top bipolar electrode.

While the positive current collector 220 extends along the length of the S-shaped stack 200, the cathodes 204 on the inner surface of the positive current collector 220 do not extend through and are not present in the turns (i.e., folds) of the S-shaped stack 200. The positive current collector 220 and the layer of the gel 210 adjacent to the positive current collector 220 fold along with the bipolar electrodes and the layers of the gel 210 adjacent to the bipolar electrodes as shown. The cathodes 204 on the inner surface of the positive current collector 220 are separated (i.e., spaced) from each other to allow folding of the S-shaped stack 200 as shown.

The negative current collector 222 is arranged below the bottom bipolar electrode in the S-shaped stack 200. Specifically, a layer of the gel 210 is arranged on the cathodes 204 of the bottom bipolar electrode in the S-shaped stack 200, and the negative current collector 222 is arranged on the layer of the gel 210 that is arranged on the cathodes 204 of the bottom bipolar electrode. A layer of the anodes 206 is arranged on an inner surface of the negative current collector 222 so that the layer of the anodes 206 on the inner surface of the negative current collector 222 is sandwiched between the inner surface of the negative current collector 222 and the layer of the gel 210 that is arranged on the anodes 206 of the bottom bipolar electrode.

While the negative current collector 222 extends along the length of the S-shaped stack 200, the anodes 206 on the inner surface of the negative current collector 222 do not extend through and are not present in the turns (i.e., folds) of the S-shaped stack 200. The negative current collector 222 and the layer of the gel 210 adjacent to the negative current collector 222 fold along with the bipolar electrodes and the layers of the gel 210 adjacent to the bipolar electrodes as shown. The anodes 206 on the inner surface of the negative current collector 222 are separated (i.e., spaced) from each other to allow folding of the S-shaped stack 200 as shown.

Accordingly, in general, the S-shaped stack 200 comprises N bipolar electrodes, the positive current collector 220, the negative current collector 222, and N+1 layers of the gel 210 stacked vertically on top of one another along the Z-axis in the order described above, where N is an integer greater than 1. The bipolar electrodes and the positive and negative current collectors 220, 222 have structures described above.

The N bipolar electrodes, the positive current collector 220, the negative current collector 222, and N+1 layers of the gel 210 are shown as not contacting (i.e., as having gaps between) each other for illustrative purposes. In fact, these elements contact each other (i.e., have no gaps between them).

The S-shaped stack 200 is packed in a battery container by applying pressure from top and/or bottom of the S-shaped stack 200 along the Z-axis. The S-shaped stack 200 is scalable in that the length of the N vertically stacked bipolar electrodes along with the N+1 layers of the gel 210 and the positive and negative current collectors 220, 220 is folded M times in the S-shape along the Z-axis, where M is an integer greater than 1, where M is selected according to the height of the battery container, and where N and M are selected according to the power requirements of the battery.

In each fold of the S-shaped stack 200, the total length of the fold measured along the X-axis (i.e., along the length of the battery) is a sum of the length of the bipolar electrodes and lengths L of the turns on either side of the bipolar electrodes. A first side of the folds of the S-shaped stack 200 has the positive current collector 220 as the outermost layer, which forms a first terminal of the battery. A second side of the folds of the S-shaped stack 200 has the negative current collector 222 as the outermost layer, which form a second terminal of the battery.

At the bottom of FIG. 2, a top view of the S-shaped stack 200 is shown with the negative current collector 222 being the last layer on top of the S-shaped stack 200. The shadings shown in the top view will be opposite if the positive current collector 220 is the last layer on top of the S-shaped stack 200.

In FIG. 4, the spacing between the cathodes 204 and between the anodes 206 in the S-shaped stack 200 is shown in further detail. A length of a stack of the bipolar electrodes, the layers of the gel 210, and the positive and negative current collectors 220, 222 are shown. The bipolar electrodes, the layers of the gel 210, and the positive and negative current collectors 220, 222 are shown separately for illustrative purpose. In this example, dimensions L1<L2<L3<L4. The values of L1, L2, L3, and L4 depend on the thicknesses of the electrodes and the gel 210. As mentioned above, the anodes 206 are slightly longer than the cathodes 204. Accordingly, the anodes 206 have a larger area than the cathodes 204.

The cathodes 204 on the inner surface of the positive current collector 220 and the cathodes 204 of the bipolar electrodes stacked below the positive current collector 220 can be considered as being arranged in rows and columns as follows. A first cathode 204 on the inner surface of the positive current collector 220 and the cathodes 204 of the bipolar electrodes directly below the first cathode 204 can be considered as being arranged in a first column. A second cathode 204 on the inner surface of the positive current collector 220 adjacent to the first cathode 204 and the cathodes 204 of the bipolar electrodes directly below the second cathode 204 can be considered as being arranged in a second column that is adjacent to the first column; and so on. These columns of cathodes 204 are adjacent to each other along the X-axis.

The cathodes 204 on the inner surface of the positive current collector 220 can be considered as being arranged in a first row. The cathodes 204 of a first bipolar electrode directly under the positive current collector 220 can be considered as being arranged in a second row. The cathodes 204 of a second bipolar electrode directly under the first bipolar electrode can be considered as being arranged in a third row; and so on. These rows of the cathodes 204 are adjacent to each other along the Z-axis.

In the example shown in FIG. 4, there are six columns and four rows of the cathodes 204. In the first and second columns of the cathodes 204, the cathodes 204 in the first row are separated by a distance L1, the cathodes 204 in the second row are separated by a distance L2; the cathodes 204 in the third row are separated by a distance L3; and the cathodes 204 in the fourth row are separated by a distance L4. In the second and third columns of the cathodes 204, the cathodes 204 in the fourth row are separated by a distance L1, the cathodes 204 in the third row are separated by a distance L2; the cathodes 204 in the second row are separated by a distance L3; and the cathodes 204 in the first row are separated by a distance L4. This pattern of separating (i.e., distancing) the cathodes 204 is repeated in subsequent columns along the X-axis.

Accordingly, the cathodes 204 in the rows of the first column are separated from the cathodes 204 in the rows of the second column by distances that increase downwardly in the stack along the Z-axis; the cathodes 204 in the rows of the second column are separated from the cathodes 204 in the rows of the third column by distances that increase upwardly in the stack along the Z-axis; and the pattern is repeated in successive columns.

Due to the above pattern, the stack of the bipolar electrodes, the layers of the gel 210, and the positive and negative current collectors 220, 222 can be folded at the locations shown by the arrows to form the S-shaped stack 200 shown in FIG. 3. Specifically, the above pattern causes the cathodes 204 to align vertically across the folds of the S-shaped stack 200. Further, the above pattern ensures that the bipolar current collectors 208, the layers of the gel 210, and the positive and negative current collectors 220, 222 turn at each fold of the S-shaped stack 200.

Figure 5A:
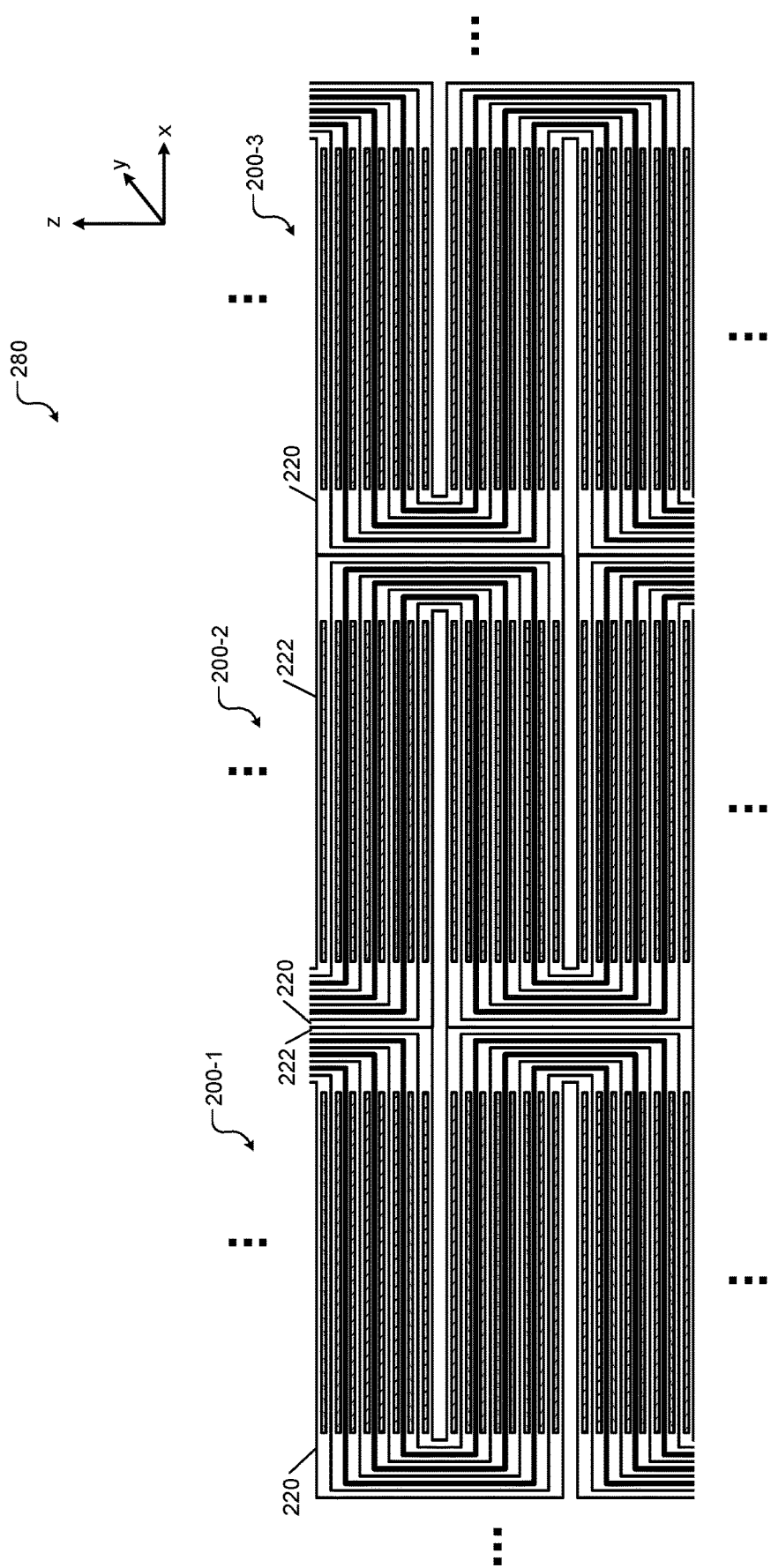
FIG. 5A is a cross-sectional view of an example of a battery including a plurality of folded bipolar batteries that abut and make electrical contact along folded portions according to the present disclosure.
Figure 5B:
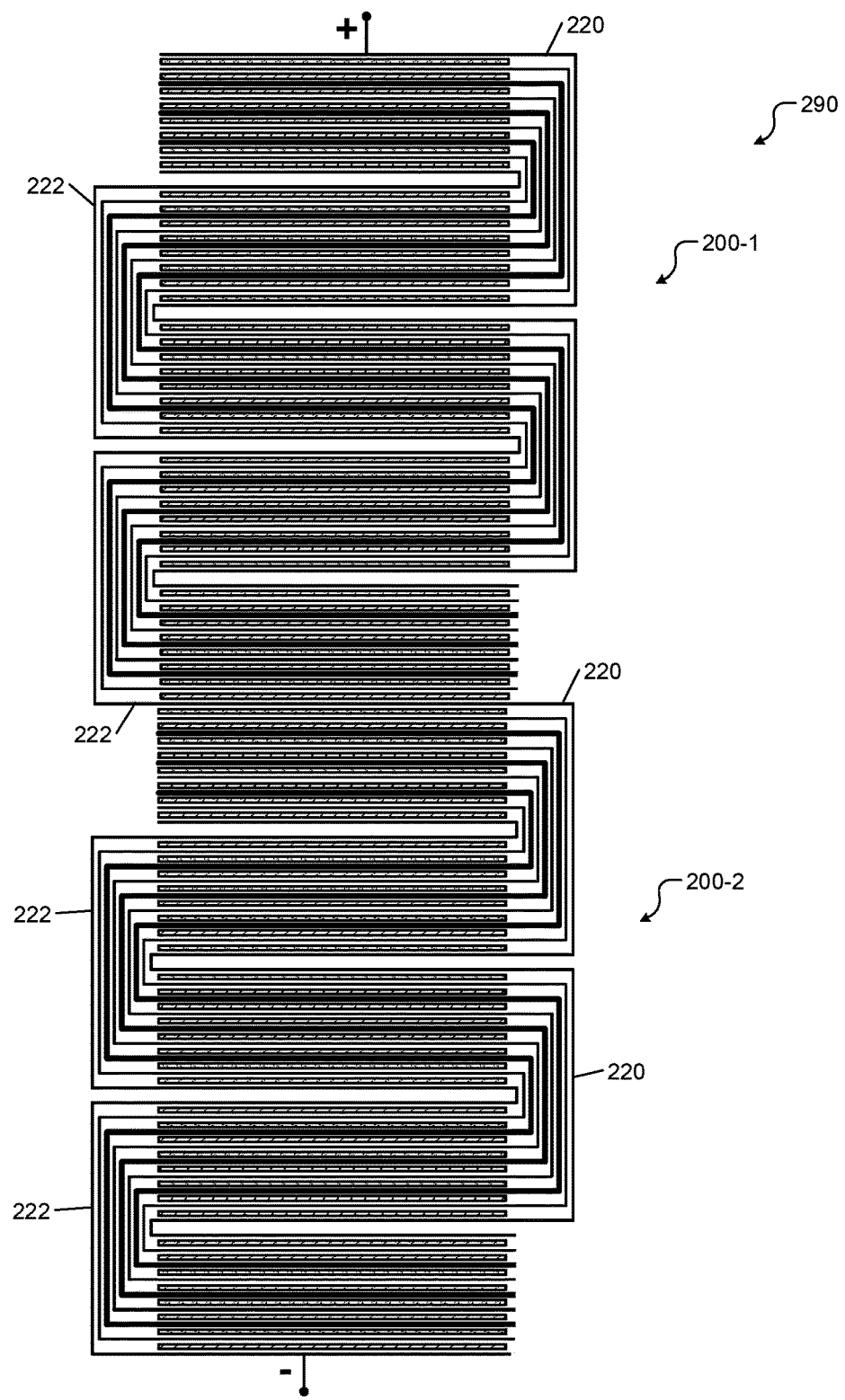
FIG. 5B is a cross-sectional view of an example of a battery including a plurality of folded bipolar batteries that abut and make electrical contact at side portions according to the present disclosure.

Referring now to FIGS. 5A and 5B, a battery 280 includes one or more folded bipolar batteries (e.g. 200-1, 200-2, 200-3, ... ) that are arranged in direct contact. For example in FIG. 5A, a negative current collector 222 of one folded bipolar battery (e.g. folded bipolar battery 200-1) is arranged in direct contact with a positive current collector 220 of an adjacent battery (e.g. folded bipolar battery 200-2) immediately adjacent to a folded portion. While three folded bipolar batteries are shown connected, any number of folded bipolar batteries can be connected in this manner as will be described further below.

For example in FIG. 5B, a negative current collector 222 of one folded bipolar battery (e.g. folded bipolar battery 200-1) is arranged in direct contact with a positive current collector 220 of an adjacent battery (e.g. folded bipolar battery 200-2) along side surfaces thereof (as opposed to adjacent to the folded portion shown in FIG. 5A).

As can be appreciated, the arrangements shown in FIGS. 5A and 5B can be used alone or in combination to improve battery power density and to reduce cost by eliminating welded tabs and busbars.

Figure 6:
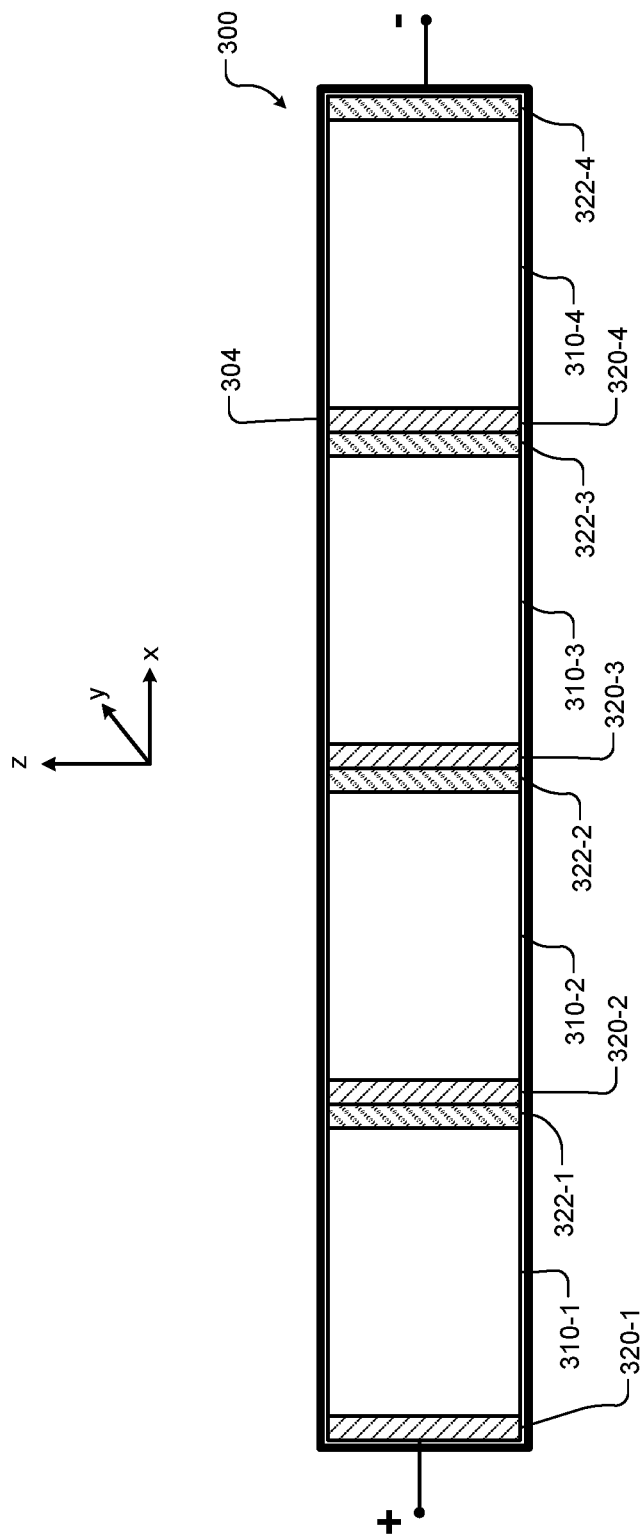
FIG. 6 is a plan view of an example of a battery including a plurality of folded bipolar batteries that abut and make electrical contact along folded portions according to the present disclosure.

Referring now to FIG. 6, a battery 300 includes a plurality of folded bipolar batteries 310-1, 310-2, 310-3, and 310-4 that are arranged in an enclosure 304. While four folded bipolar batteries are shown, additional or fewer folded bipolar batteries can be used. The plurality of folded bipolar batteries 310-1, 310-2, 310-3, and 310-4 include positive current collectors 320-1, 320-2, 320-3, and 320-4 and negative current collectors 322-1, 322-2, 322-3, and 322-4, respectively.

For example, the negative current collector 322-1 of one folded bipolar battery 310-1 is arranged in contact with a positive current collector 320-2 of the folded bipolar battery 310-2 located immediately adjacent thereto. As can be appreciated, the contact is made at the folded portions as shown in FIG. 5A.

Figure 7:
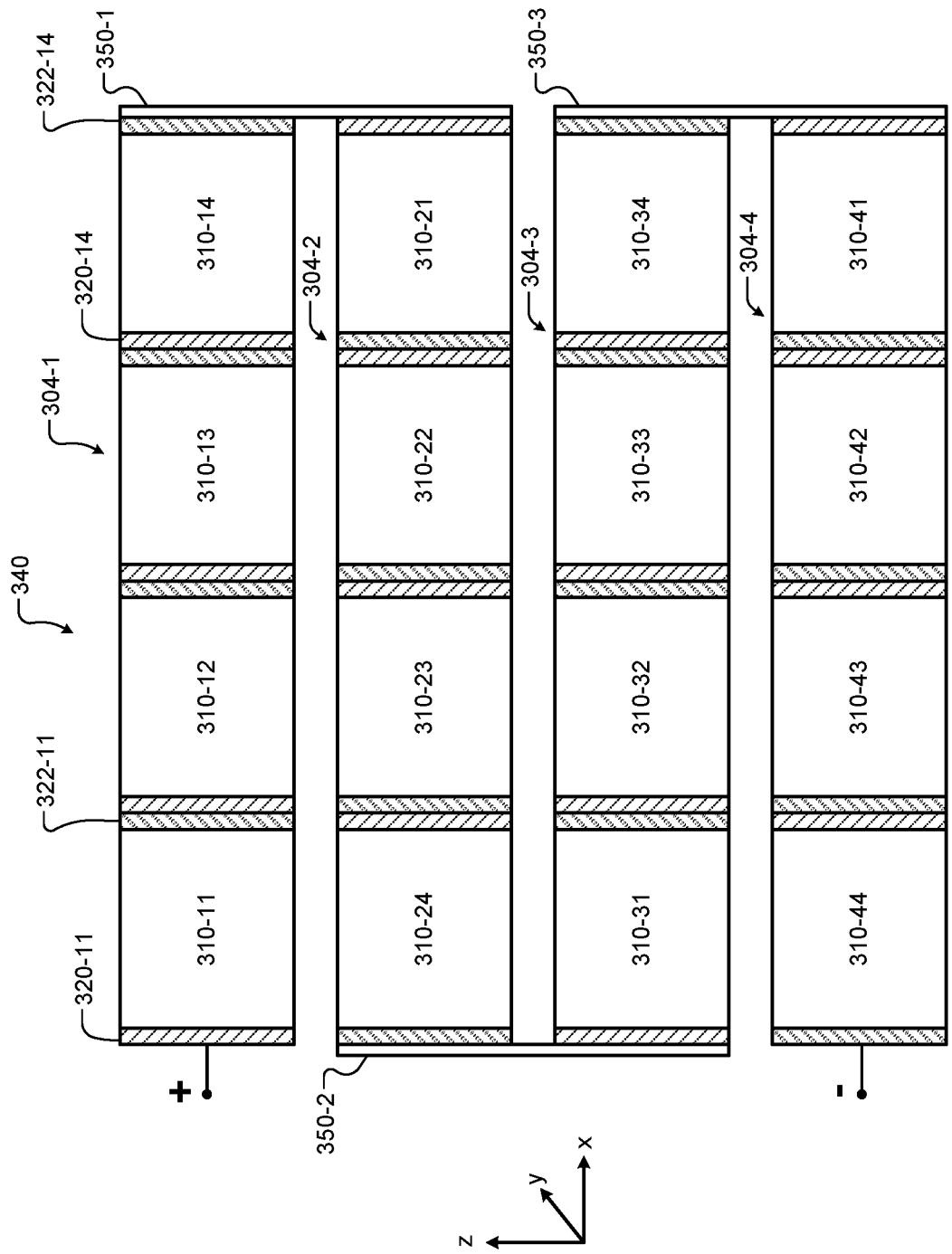
FIG. 7 is a plan view of an example of a battery including a plurality of groups of folded bipolar batteries that are connected in series and that abut and make electrical contact along folded portions according to the present disclosure.

Referring now to FIG. 7, an additional example of a battery 340 is shown. The battery 340 includes an array of folded bipolar batteries 310-11, 310-12, ..., and 310-44. Each of the plurality of folded bipolar batteries 310-11, 310-12, ..., and 310-44 includes positive current collectors 320-11, 320-12, ..., and negative current collectors 322-11, 322-12, ... as described above.

While a four-by-four array is shown, the array can include any number of rows or columns. A first group 304-1 of the folded bipolar batteries 310-11, 310-12, 310-13, and 310-14 is connected as shown in FIG. 5A. A second group 304-2 of the folded bipolar batteries 310-21, 310-22, 310-23, and 310-24 is connected as shown in FIG. 5A. A third group 304-3 of the folded bipolar batteries 310-31, 310-32, 310-33, and 310-34 is connected as shown in FIG. 5A. A fourth group 304-4 of the folded bipolar batteries 310-41, 310-42, 310-43, and 310-44 is connected as shown in FIG. 5A.

As can be seen, the polarity of the second group 304-2 and the fourth group 304-4 is inverted relative to the first group 304-1 and the third group 304-3. A positive terminal of the battery is connected to the positive current collector of the folded bipolar battery 310-11. A busbar 350-1 connects the negative current collector of the folded bipolar battery 310-14 to a positive current collector of the folded bipolar battery 310-21. A busbar 350-2 connects the negative current collector of the folded bipolar battery 310-24 to a positive current collector of the folded bipolar battery 310-31. A busbar 350-3 connects the negative current collector of the folded bipolar battery 310-34 to a positive current collector of the folded bipolar battery 310-41. A negative terminal of the battery is connected to the negative current collector of the folded bipolar battery 310-44.

Figure 8:
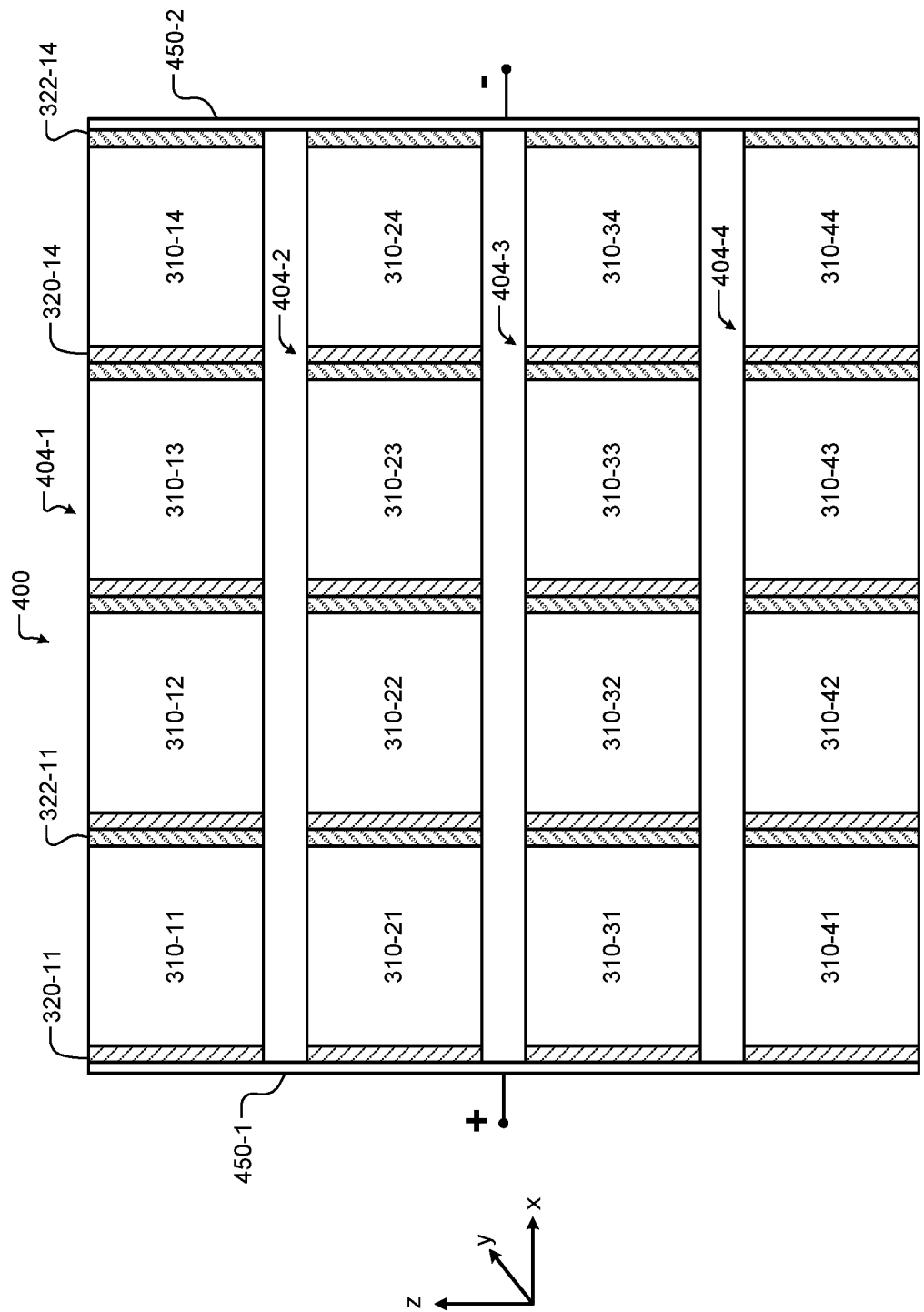
FIG. 8 is a plan view of an example of a battery including a plurality of groups of folded bipolar batteries that are connected in parallel and that abut and make electrical contact along folded portions according to the present disclosure.

Referring now to FIG. 8, an additional example of a battery 400 including folded bipolar batteries that are arranged with abutting folded portions as shown in FIG. 5A. The battery 400 includes a plurality of folded bipolar batteries 310-11, 310-12, . . . , and 310-44. Each of the plurality of folded bipolar batteries 310-11, 310-12, . . . , and 310-44 includes positive current collectors 320-11, 320-12, . . . , and negative current collectors 322-11, 322-12, . . . as described above.

While a four-by-four array is shown, the array can include any number of rows or columns. A first group of the folded bipolar batteries 310-11, 310-12, 310-13, and 310-14 is connected as shown in FIG. 5A. A second group of the folded bipolar batteries 310-21, 310-22, 310-23, and 310-24 is connected as shown in FIG. 5A. A third group of the folded bipolar batteries 310-31, 310-32, 310-33, and 310-34 is connected as shown in FIG. 5A. A fourth group of the folded bipolar batteries 310-41, 310-42, 310-43, and 310-44 is connected as shown in FIG. 5A.

A busbar 450-1 is connected to positive current collectors of the folded bipolar batteries 310-11, 310-21, 310-31 and 310-41. A busbar 450-2 is connected to negative current collectors of the folded bipolar batteries 310-14, 310-24, 310-34 and 310-44. A positive terminal of the battery is connected to the busbar 450-1. A negative terminal of the battery is connected to the busbar 450-2.

Figure 9:
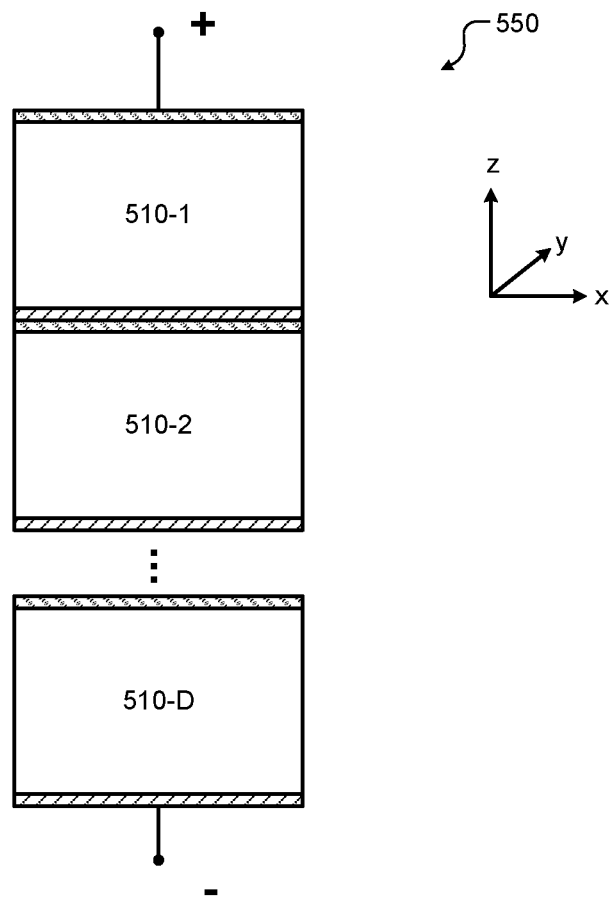
FIG. 9 is a plan view of an example of a battery including a plurality folded bipolar batteries that are connected in series and that abut and make electrical contact at side portions according to the present disclosure.

Referring now to FIG. 9, an additional example of a battery 550 including folded bipolar batteries that are arranged with abutting side portions as shown in FIG. 5B. The battery 550 includes a plurality of folded bipolar batteries 510-1, 510-2, . . . , and 510-D (where D is an integer greater than one). Each of the plurality of folded bipolar batteries 510-1, 510-2, . . . , and 510-D includes positive current collectors and negative current collectors as described above.

A positive terminal of the battery 550 is connected to a side portion of the positive current collector of the folded bipolar battery 510-1. A negative current collector of the folded bipolar battery 510-1 abuts a positive current collector of the folded bipolar batteries 510-2 and so on. A negative current collector of the folded bipolar battery 510-D is connected to a negative terminal of the battery 550.

Figure 10A:
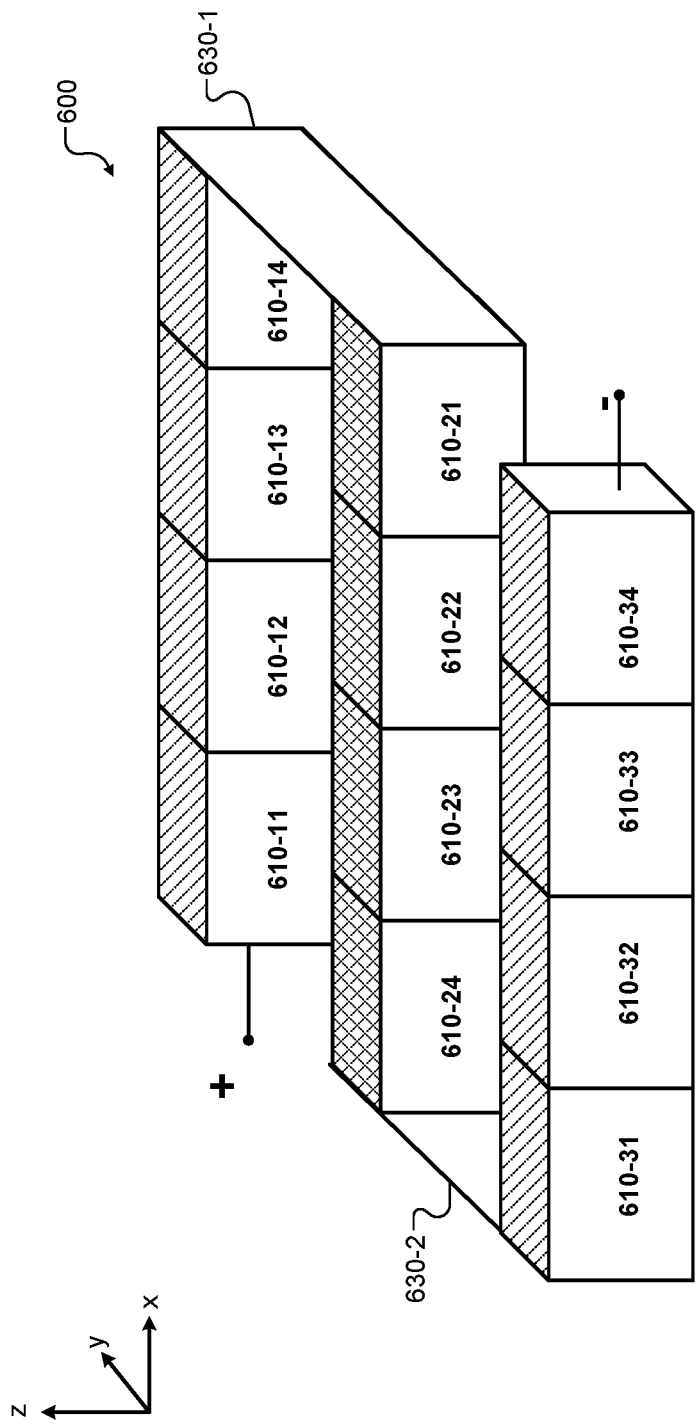
FIGS. 10A and 10B are plan views of an example of a battery including a plurality of groups of folded bipolar batteries that are connected in series and parallel and that abut and make electrical contact along folded portions and side portions according to the present disclosure.

Referring now to FIG. 10A, an additional example of a battery 600 is shown. The battery 600 includes an array of folded bipolar batteries 610-11, 610-12, . . . , and 610-34. Each of the plurality of folded bipolar batteries 610-11, 610-12, . . . , and 610-34 includes positive current collectors 320-11, 320-12, . . . , and negative current collectors 322-11, 322-12, . . . as described above.

A positive terminal of the battery 600 is connected to a positive current collector of the folded bipolar battery 610-11. A busbar 630-1 is connected to a negative current collector of the folded bipolar battery 610-14 and a positive current collector of the folded bipolar battery 610-21. A busbar 630-2 is connected to a negative current collector of the folded bipolar battery 610-24 and a positive current collector of the folded bipolar battery 610-31. A negative terminal of the battery 600 is connected to the negative current collector of the folded bipolar battery 610-34.

While a three-by-four array is shown, the array can include any number of rows or columns. A first group of the folded bipolar batteries 610-11, 610-12, 610-13, and 610-14 is connected as shown in FIG. 5A. A second group of the folded bipolar batteries 610-21, 610-22, 610-23, and 610-24 is connected as shown in FIG. 5A. A third group of the folded bipolar batteries 610-31, 610-32, 610-33, and 610-34 is connected as shown in FIG. 5A.

As can be seen, the polarity of the second group is inverted relative to the first and third groups. A positive terminal of the battery is connected to the positive current collector of the folded bipolar battery 610-11. A busbar 630-1 connects the negative current collector of the folded bipolar battery 610-14 to a positive current collector of the folded bipolar battery 610-21. A busbar 630-2 connects the negative current collector of the folded bipolar battery 610-24 to a positive current collector of the folded bipolar battery 610-31. A negative terminal of the battery is connected to the negative current collector of the folded bipolar battery 610-34.

Figure 10B:
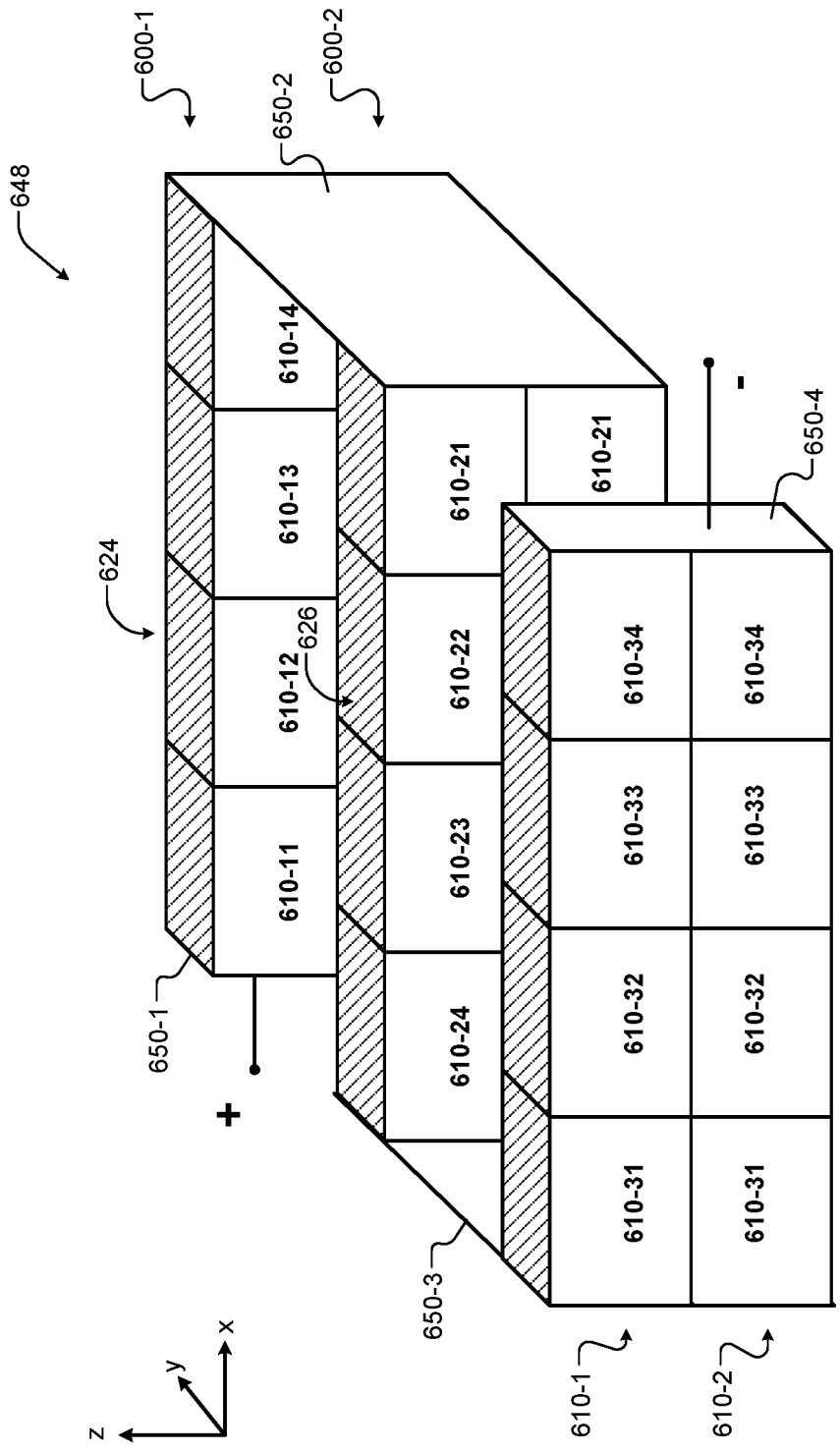

In FIG. 10B, a battery 648 uses connections similar to those shown in FIGS. 5A and 5B. The battery 648 includes two of the batteries 600 of FIG. 10A (similar to FIG. 5A). Side portions of the positive current collectors of one of the batteries 600-1 abut side portions of the negative current collectors on the other one of the batteries 600-2 (similar to FIG. 5B).

A positive terminal of the battery 648 is connected to a busbar 650-1 that is connected to positive current collectors of the folded bipolar batteries 610-11. A busbar 650-2 is connected to negative current collectors of the folded bipolar batteries 610-14 and positive current collectors of the folded bipolar batteries 610-21. A busbar 630-2 is connected to negative current collectors of the folded bipolar batteries 610-24 and positive current collectors of the folded bipolar batteries 610-31. A negative terminal of the battery 648 is connected to a busbar 650-4 that is connected to negative current collectors of the folded bipolar batteries 610-34.

Figure 11:
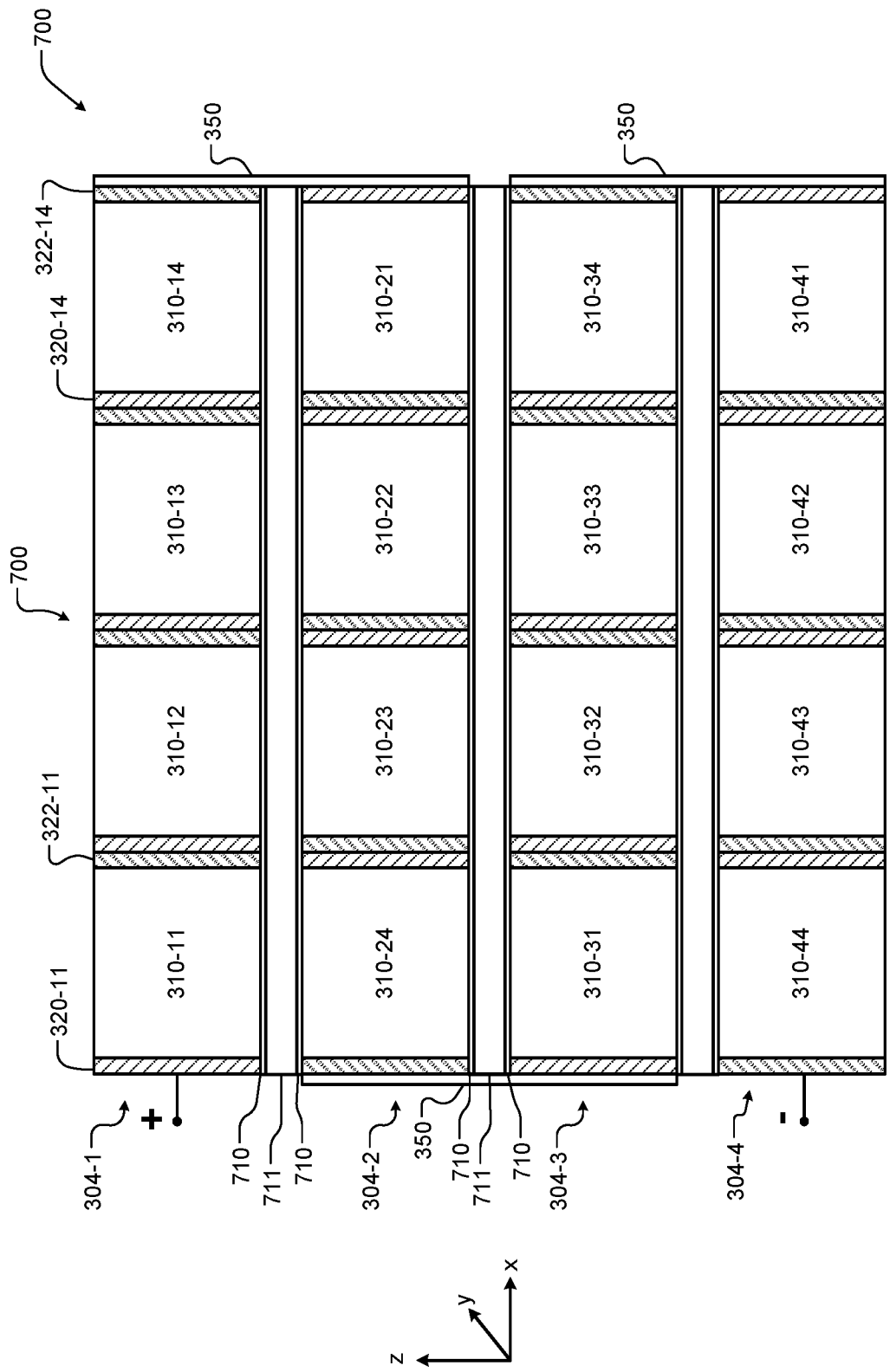
FIG. 11 is a plan view of an example of a battery including a plurality of groups of folded bipolar batteries that are connected in series, that abut and make electrical contact along folded portions and that include thermal gel and a manifold with coolant channels according to the present disclosure.

Referring now to FIG. 11, a battery 700 is similar to the battery shown in FIG. 7. However, thermal gel 710 and cooling manifolds 711 with coolant channels 712 are used. The thermal gel 710 is in contact with side portions of the folded bipolar batteries of the first group 304-1 and the second group 304-2 (or folded portions if the arrangement of FIG. 9 is used). Outer surfaces of the cooling manifold 711 are arranged in thermal contact with the thermal gel 710. Similarly, the thermal gel 710 and the cooling manifold 711 are arranged between the second group 304-2 and the third group 304-3 and the third group 304-3 and the fourth group 304-4. The thermal gel 710 and the cooling manifolds 711 can also be arranged on outer sides of the first group 304-1 and the fourth group 304-4 (not shown).

Referring now to FIG. 12, the coolant channels 712 of the coolant manifold 711 are connected to a pump 734 and a coolant source 730. A controller 738 selectively turns on the pump 734 to flow the liquid coolant through the coolant channels 712. A temperature sensor 740 may be used to sense a temperature of the coolant in coolant system. The temperature sensor 740 may be arranged in the coolant channels 712 and/or in other locations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery system comprising:
N folded bipolar batteries, where N is an integer greater than one, wherein each of the N folded bipolar batteries includes a positive current collector, a negative current collector, and a plurality of anodes, cathodes and current collectors arranged between the positive current collector and the negative current collector,
wherein each of the N folded bipolar batteries are folded in an "S"-shaped configuration,
wherein a plurality of first folded portions of each of the N folded bipolar batteries are arranged on one end of the "S"-shaped configuration,
wherein a plurality of second folded portions of each of the N folded bipolar batteries are arranged on an opposite end of the "S"-shaped configuration,
wherein first side portions and second side portions of each of the N folded bipolar batteries are arranged between the plurality of first folded portions and the plurality of second folded portions,
wherein at least one of:
one or more of the plurality of first folded portions on a first one of the N folded bipolar batteries are in direct electrical contact with one or more of the plurality of second folded portions on a second one of the N folded bipolar batteries; and
one or more of the first side portions on a third one of the N folded bipolar batteries are in direct electrical contact with one or more of the second side portions on a fourth one of the N folded bipolar batteries,
wherein the N folded bipolar batteries include M groups each including N/M of the N folded bipolar batteries, where M is an integer greater than zero,
wherein the M groups are connected in series, the M groups are arranged side by side, and electrical orientations of adjacent ones of the M groups alternate, and
wherein the adjacent ones of the M groups are connected together using one or more busbars.

2. The battery system of claim 1, wherein the plurality of first folded portions on first alternating ones of the N folded bipolar batteries are in direct electrical contact with the plurality of second folded portions on second alternating ones of the N folded bipolar batteries.

3. The battery system of claim 1, wherein the first side portions on first alternating ones of the N folded bipolar batteries are in direct electrical contact with the second side portions on second alternating ones of the N folded bipolar batteries.

4. The battery system of claim 1, further comprising:
thermal gel on facing surfaces of the at least two of the M groups; and
a coolant manifold including cooling channels and arranged between the at least two of the M groups and in contact with thermal gel on the facing surfaces of at least two of the M groups.

5. The battery system of claim 1, wherein:
the plurality of first folded portions on at least one of the N folded bipolar batteries are in direct electrical contact with the plurality of second folded portions on a second one of the N folded bipolar batteries; and
the first side portion on a third one of the N folded bipolar batteries is in direct electrical contact with the second side portion on a fourth one of the N folded bipolar batteries.

6. A battery system comprising:
N folded bipolar batteries, where N is an integer greater than one, wherein:
each of the N folded bipolar batteries are folded in an "S"-shaped configuration,
a plurality of first folded portions of each of the N folded bipolar batteries are arranged on one end of the "S"-shaped configuration,
a plurality of second folded portions of each of the N folded bipolar batteries are arranged on an opposite end of the "S"-shaped configuration,
first side portions and second side portions of each of the N folded bipolar batteries are arranged between the plurality of first folded portions and the plurality of second folded portions,
at least two of the plurality of first folded portions of a first one of the N folded bipolar batteries are in direct electrical contact with at least two of the plurality of second folded portions of a second one of the N folded bipolar batteries,
wherein the N folded bipolar batteries include M groups each including N/M of the N folded bipolar batteries, where M is an integer greater than zero, and
adjacent pairs of the M groups are connected together using one or more busbars.

7. The battery system of claim 6, wherein the plurality of first folded portions on first alternating ones of the N folded bipolar batteries are in direct electrical contact with the plurality of second folded portions on second alternating ones of the N folded bipolar batteries.

8. The battery system of claim 6, wherein at least one of the first side portions on a third one of the N folded bipolar batteries is in direct electrical contact with at least one of the second side portions a fourth one of the N folded bipolar batteries.

9. A battery system comprising:
N folded bipolar batteries, where N is an integer greater than one, wherein:
a plurality of first folded portions of each of the N folded bipolar batteries are arranged on one end of an "S"-shaped configuration,
a plurality of second folded portions of each of the N folded bipolar batteries are arranged on an opposite end of the "S"-shaped configuration, and
first and second side portions are arranged between the plurality of first folded portions and the plurality of second folded portions,
the plurality of first folded portions of a first one of the N folded bipolar batteries are in direct electrical contact with the plurality of second folded portions of a second one of the N folded bipolar batteries, the first side portion on a third one of the N folded bipolar batteries is in direct electrical contact with the second side portion on a fourth one of the N folded bipolar batteries, the N folded bipolar batteries include M groups each including N/M of the N folded bipolar batteries, where M is an integer greater than zero, and the battery system further includes thermal gel on facing surfaces of the at least two of the M groups, and a coolant manifold including cooling channels and arranged between the at least two of the M groups and in contact with thermal gel on the facing surfaces of at least two of the M groups.

10. The battery system of claim 9, wherein:

first ones of the M groups are connected in series; and
second ones of the M groups are connected in parallel.

\* \* \* \* \*